(12) United States Patent
Doss et al.

(10) Patent No.: US 6,538,857 B1
(45) Date of Patent: Mar. 25, 2003

(54) READ HEAD WITH N-CYCLE SWITCH FOR ELECTROSTATIC DISCHARGE (ESD) PROTECTION

(75) Inventors: Saad Doss, Gilroy, CA (US); Glen Adam Garfunkel, San Jose, CA (US); Edward Hin Pong Lee, San Jose, CA (US); Chie Ching Poon, San Jose, CA (US); Neil Leslie Robertson, Palo Alto, CA (US); Andrew Ching Tam, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 09/662,247

(22) Filed: Sep. 14, 2000

(51) Int. Cl.⁷ .................................................. G11B 5/40
(52) U.S. Cl. ........................................ 360/323; 430/319
(58) Field of Search .................... 360/323; 219/121.85, 219/121.66; 29/603.03, 603.07; 430/319, 311, 945

(56) References Cited

U.S. PATENT DOCUMENTS

| | | | |
|---|---|---|---|
| 5,699,212 A | * 12/1997 | Erpelding et al. | ....... 360/234.5 |
| 5,759,428 A | 6/1998 | Balamane et al. | ..... 219/121.66 |
| 6,146,813 A | * 11/2000 | Girard et al. | .......... 219/121.85 |
| 6,239,685 B1 | * 5/2001 | Albrecht et al. | ....... 251/129.02 |

FOREIGN PATENT DOCUMENTS

| | | | |
|---|---|---|---|
| EP | 000589519 A2 | * | 3/1994 |
| JP | 61-190955 A | * | 8/1986 |
| JP | 9-97910 A | * | 4/1997 |
| JP | 11-153810 A | * | 6/1999 |
| JP | 11-204598 A | * | 7/1999 |

* cited by examiner

Primary Examiner—William Klimowicz
(74) Attorney, Agent, or Firm—Ervin F. Johnston (57) ABSTRACT

A read head is provided with an N-cycle switch for sequentially shorting and unshorting a sense current circuit of a read head so that the read head will be protected from electrostatic discharges (ESDs) by shorting when the read head is not being tested and unshorted during tests of the read head. The shorting and unshorting switches, which are mounted on or in a slider carrying the read head, are activated by a laser beam.

32 Claims, 11 Drawing Sheets

FIG. 9
(ABS)

READ HEAD WITH N-CYCLE SWITCH FOR ELECTROSTATIC DISCHARGE (ESD) PROTECTION

BACKGROUND OF THE INVENTION

1. Field of the Invention

The present invention relates to a read head with an N-cycle switch for electrostatic discharge (ESD) protection and, more particularly, to such a read head which has multiple one cycle switches which can be operated by a laser beam for sequentially shorting and unshorting the read head across a sense current circuit.

2. Description of the Related Art

The heart of a computer is an assembly that is referred to as a magnetic disk drive. The magnetic disk drive includes a rotating magnetic disk, a slider which supports a write head and a read head magnetic head assembly, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The read head includes a sensor which is located between ferromagnetic first and second shield layers. First and second leads are connected to the sensor and to the processing circuitry for conducting a sense current through the sensor. When the sensor detects signal fields from a track of a rotating magnetic disk the resistance of the sensor changes which changes the potential in the sense current circuit. These potential changes are processed as playback signals by the processing circuitry. Two types of magnetoresistive (MR) sensors are located between nonmagnetic insulative first and second read gap layers which are, in turn, located between the first and second shield layers. One type of magnetoresistive sensor is an anisotropic magnetoresistive (AMR) sensor and the other type is a spin valve (SV) sensor. A third type of sensor is a tunnel valve sensor which may employ the first and second shield layers as first and second lead layers. In this type of sensor the first and second read gap layers may be omitted.

Magnetic head assemblies are constructed on a wafer which has rows and columns of magnetic head assemblies. Multiple thin film layers are typically deposited to form the read head portions followed by multiple thin film layers which are deposited to form the write head portions. The construction at the wafer level embeds each magnetic head assembly in a respective slider portion of the wafer. The wafer is then diced into rows of sliders and lapped to form the aforementioned ABS. Each row of sliders is then diced into individual sliders. One or more sliders are then mounted in the aforementioned disk drive.

The sensor is a very thin component of the read head which may be on the order of 150 Å. A very small current from an unwanted source can destroy the sensor which, in turn, renders the read head inoperable. This unwanted current can reach the sensor through the aforementioned sense current circuitry. During the making of the magnetic head assemblies at the row, slider and individual level the sensor can be subjected to electrostatic discharges (ESDs) which can occur from human handling, plastic objects or other electrical sources. One way of protecting the sensor from ESDs is to short-circuit the sense current circuit. However, when the sensor is to be tested for operability, particularly at the row and individual level, the sense current circuit must be unshorted or open. Accordingly, the sensor needs to be unshorted during periods of testing and shorted during all other times in order to protect the sensor from ESDs. Since multiple tests are required the sensor has to be sequentially unshorted and shorted up to the time it becomes operable in a magnetic disk drive. One technique of unshorting the sensor is found in commonly owned U.S. Pat. No. 5,759,428 wherein a laser is employed for cutting a delete pad, thereby unshorting the sense current circuit.

SUMMARY OF THE INVENTION

The present invention provides an apparatus and method for shorting and unshorting a sense current circuit of a sensor in a read head multiple times so that the sensor is alternately protected from ESDs and readied for testing. This is accomplished by providing an N-cycle switch in the sense current circuit, hereinafter referred to as the read head circuit, which has at least one one-cycle switch. In the preferred embodiment the N-cycle switch has multiple one-cycle switches wherein each one-cycle switch includes a shorting switch and an unshorting switch for shorting the read head circuit and unshorting the read head circuit, respectively. Each shorting and unshorting switch is constructed for activation by a laser beam. In one embodiment the shorting switch includes first and second contacts which are separated by an electrically insulative layer which is preferably aluminum oxide ($Al_2O_3$). When this switch is subjected to a laser beam of sufficient fluence the first of the first and second contacts melts which, in turn, melts the insulation layer which, in turn, melts the other contact causing the first and second contacts to electrically connect. In another embodiment the shorting switch may be constructed of first and second contacts which are separated by a void. Upon subjecting this switch to a laser beam of sufficient fluence the contact first receiving the laser beam melts into the void contacting and making electrical connection with the other contact.

In the preferred embodiment both of the shorting and unshorting switches are embedded below a surface of the slider so as to protect the contacts from ESDs and contamination. The layer of material of the slider between its surface and the switch is preferably aluminum oxide ($Al_2O_3$) with a sufficient thickness to permit penetration of the laser beam to activate either the shorting or the unshorting switch. In a still further preferred embodiment the switches are located in the slider at a predetermined location with respect to the read head and the ABS so that the read head and the ABS may be employed for guiding the laser beam to the appropriate location on the slider for activating either the shorting or the unshorting switch.

An object of the present invention is to provide an N-cycle switch for a read head circuit which can be employed for sequentially shorting and unshorting the read head for sequentially protecting the read head from ESDs and readying it for testing.

Another object is to provide the aforementioned N-cycle switch wherein the shorting and unshorting switches can be activated by a laser beam.

A further object is to provide a method of making the aforementioned N-cycle switch.

Still another object is to provide a method of using the aforementioned N-cycle switch.

Other objects and advantages of the invention will become apparent upon reading the following description taken together with the accompanying drawings.

DETAILED DESCRIPTION OF THE PREFERRED EMBODIMENTS

Magnetic Disk Drive

Figures 1, 2:
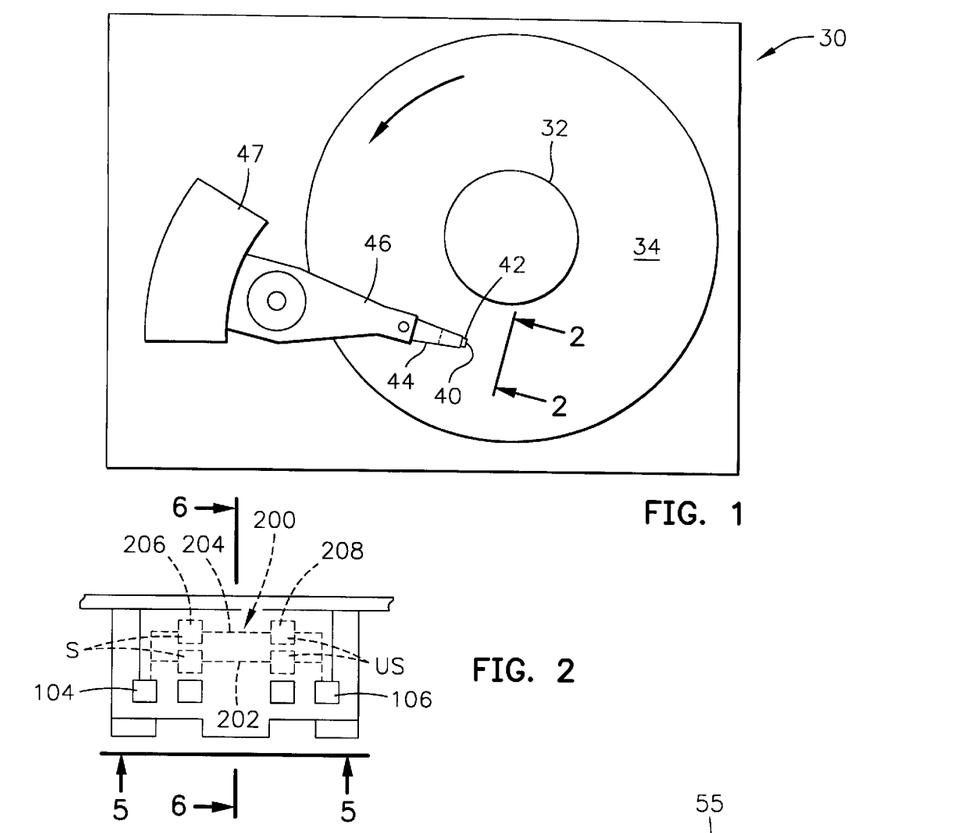
FIG. 1 is a plan view of an exemplary magnetic disk drive.
FIG. 2 is an end view of a slider with a magnetic head of the disk drive as seen in plane 2—2 of FIG. 1.
Figure 3:
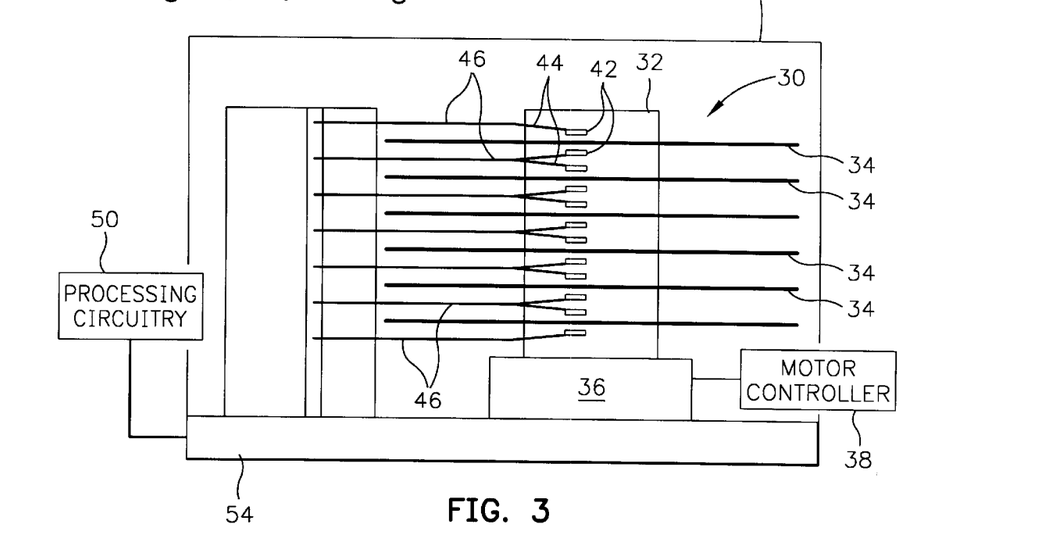
FIG. 3 is an elevation view of the magnetic disk drive wherein multiple disks and magnetic heads are employed.
Figure 4:
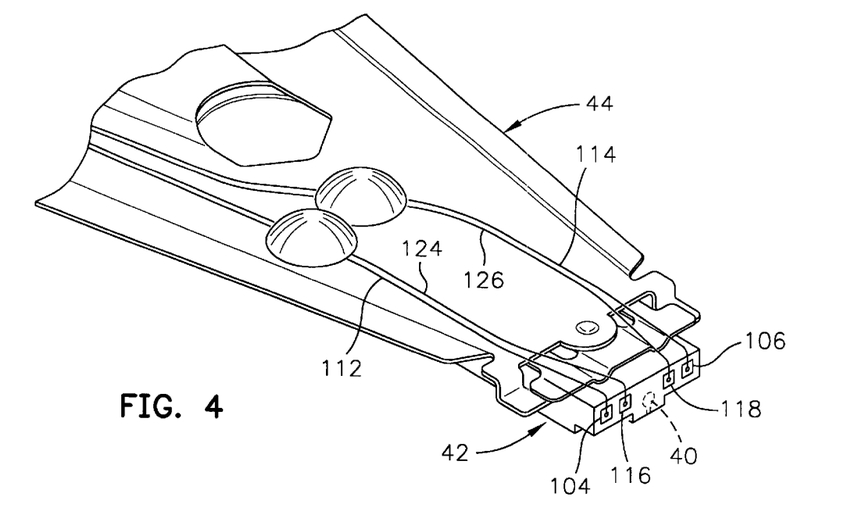
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
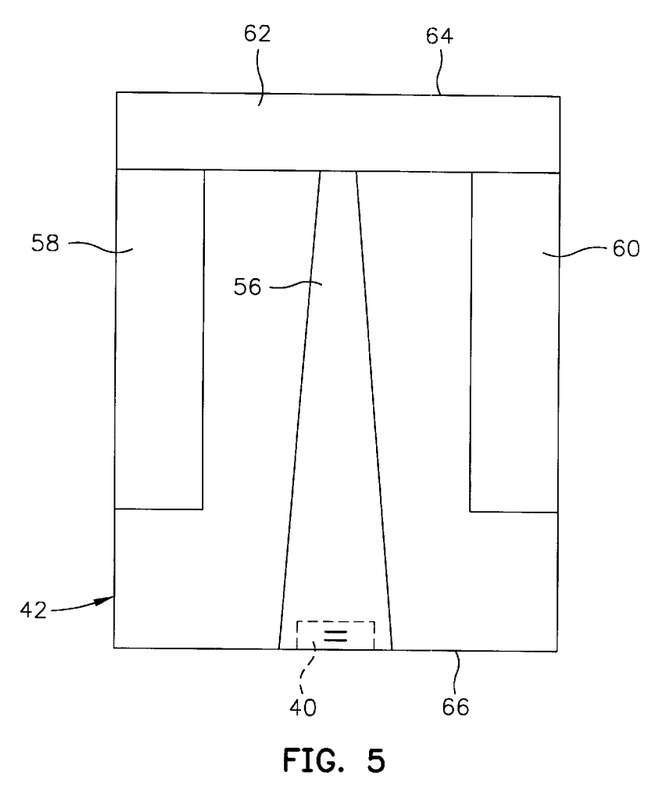
FIG. 5 is an ABS view of the slider taken along cross-section 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
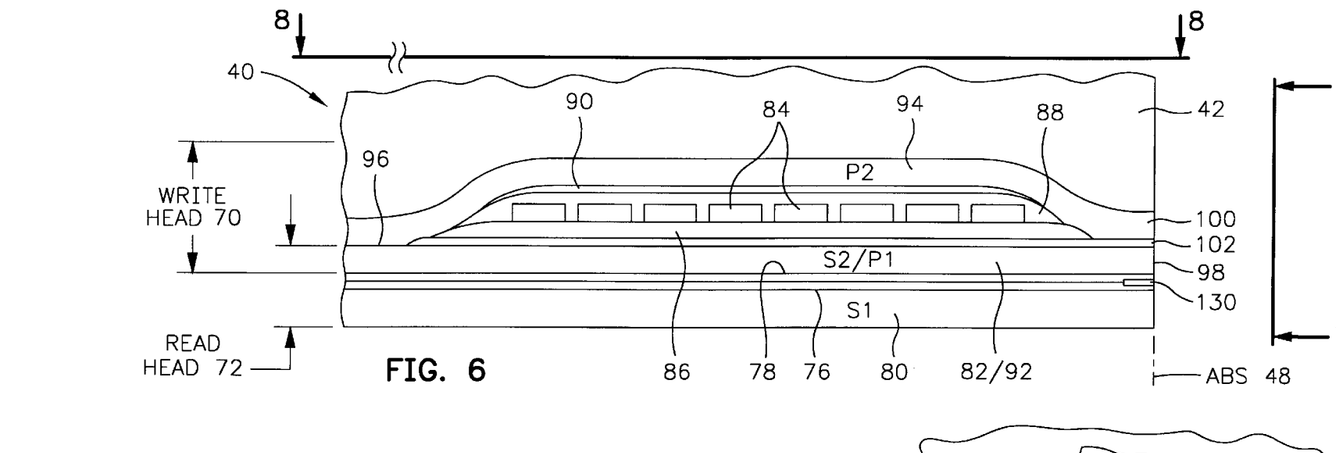
FIG. 6 is a partial view of the slider and a merged magnetic head as seen in cross-section 6—6 of FIG. 2.
Figure 7:
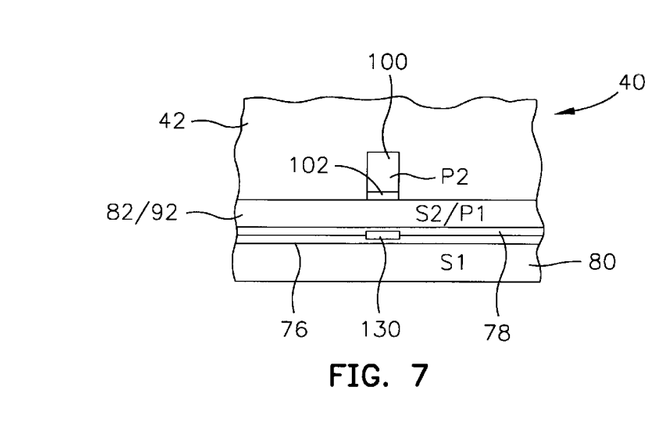
FIG. 7 is a partial ABS view of the slider taken along plane 7—7 of FIG. 6 to show the read and write elements of the merged magnetic head.

FIG. 6 is a side cross-sectional elevation view of the magnetic head 40, which includes a write head portion 70 and a read head portion 72, the read head portion employing a sensor 130. FIG. 7 is an ABS view of FIG. 6. The sensor 130 may be sandwiched between nonmagnetic electrically insulative first and second read gap layers 76 and 78, and the read gap layers are sandwiched between ferromagnetic first and second shield layers 80 and 82. In response to varying external magnetic fields, the resistance of the sensor 130 changes. A sense current Is conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer, this type of head is known as a merged magnetic head. In a piggyback head the first pole piece layer 92 and the second shield layer 82 are separate layers with an insulation layer (not shown) located therebetween. As shown in FIGS. 2 and 4, first and second solder connections 104 and 106 connect leads from the sensor 130 to leads 112 and 114 on the suspension 44, and third and fourth solder connections 116 and 118 connect leads 120 and 122 from the coil 84 (see FIG. 8) to leads 124 and 126 on the suspension.

Figure 8:
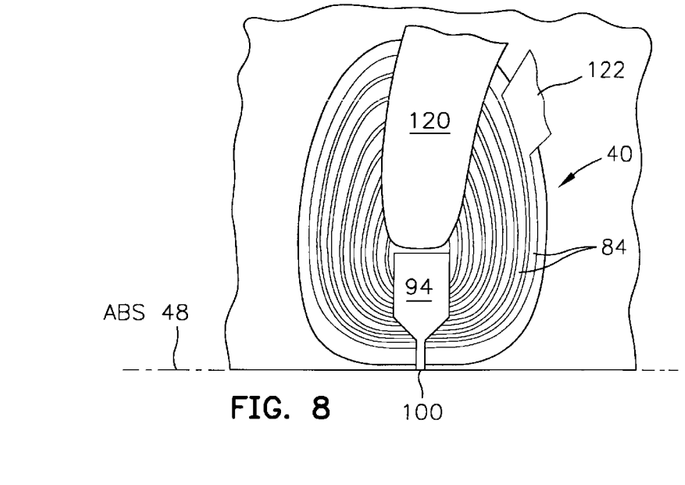
FIG. 8 is a view taken along plane 8—8 of FIG. 6 with all material above the coil layer and leads removed.
Figure 9:
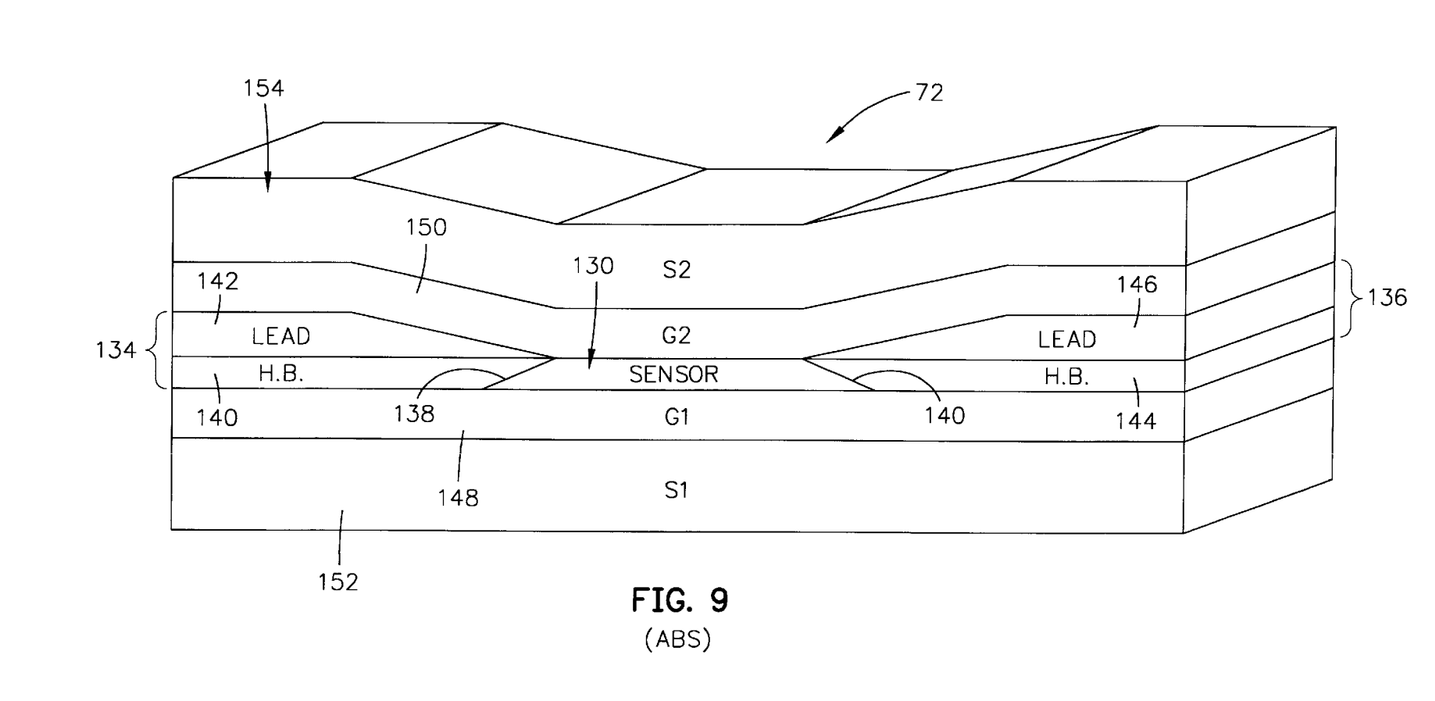
FIG. 9 is an isometric ABS illustration of a read head which employs a sensor.

FIG. 9 is an isometric ABS illustration of the read head 72 shown in FIGS. 6 or 8. The read head 72 includes a sensor 130. First and second hard bias and lead layers 134 and 136 are connected to first and second side edges 138 and 140 of the sensor.

The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the sensor 130 for stabilizing its magnetic domains therein. The sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

The first and second hard bias and lead layers 134 and 136 are connected to the first and second terminal pads 104 and 106, as shown in FIGS. 2 and 4, and the first and second terminal pads are connected to the first and second leads 112 and 114 which, in turn, are connected to the processing circuitry in FIG. 3. These components comprise a sense current circuit which includes the sensor 130 shown in FIG. 9. As discussed hereinabove, the sensor may be an AMR sensor or a spin valve sensor. Further, the sensor may be a tunnel junction sensor in which case the first and second read gap layers 148 and 150 may be omitted and the first and second shield layers 152 and 154 may be employed for conducting a sense or tunneling current perpendicular to major planes of the thin films of the sensor. During construction the magnetic head assembly is not connected to the processing circuitry 50 in FIG. 3 and is left unshorted (open) for test purposes, but should be shorted at all other times to prevent an ESD from destroying the sensor of the read head. Because of numerous tests of each magnetic head assembly it is desirable that the read head circuit be closed and opened numerous times. After one or more magnetic head assemblies are connected to the processing circuitry 50 in the magnetic disk drive 55 in FIG. 3 it is still desirable to short the read head circuit except when testing the magnetic head assembly at the disk drive level.

The Invention

Figure 10:
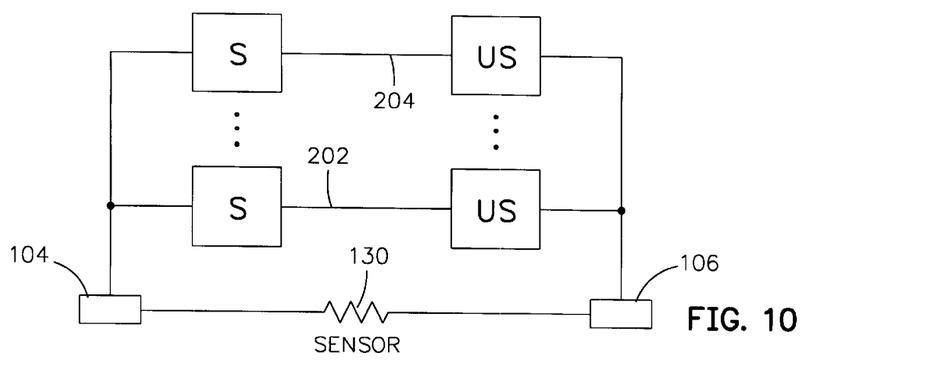
FIG. 10 is a schematic illustration of an N-cycle switch for an MR sensor which has two one-cycle switches connected across the MR sensor.

In FIG. 2 the read head circuit is closed and opened numerous times by an N-cycle switch 200 which is connected across terminal pads 104 and 106. In this example, the N-cycle switch 200 includes two one-cycle switches 202 and 204. Each of the one-cycle switches 202 and 204 has a shorting switch (S) 206 and an unshorting switch (US) 208 for shorting and unshorting, respectively, with the read head circuit (sense current circuit) across terminal pads 104 and 106. In a preferred embodiment the one-cycle switches 202 and 204 are located below the end surface of the slider, as shown in FIG. 2, with the shorting and unshorting switches 206 and 208 being activated by a laser beam, which will be discussed in more detail hereinafter. FIG. 10 is a schematic illustration of the two one-cycle switches 202 and 204 being connected across the terminal pads 104 and 106 which are, in turn, connected to the sensor 130 shown in FIG. 9. As shown by the dots, additional one-cycle switches may be employed as desired.

Figures 11A, 11B, 11C, 11D, 11E:
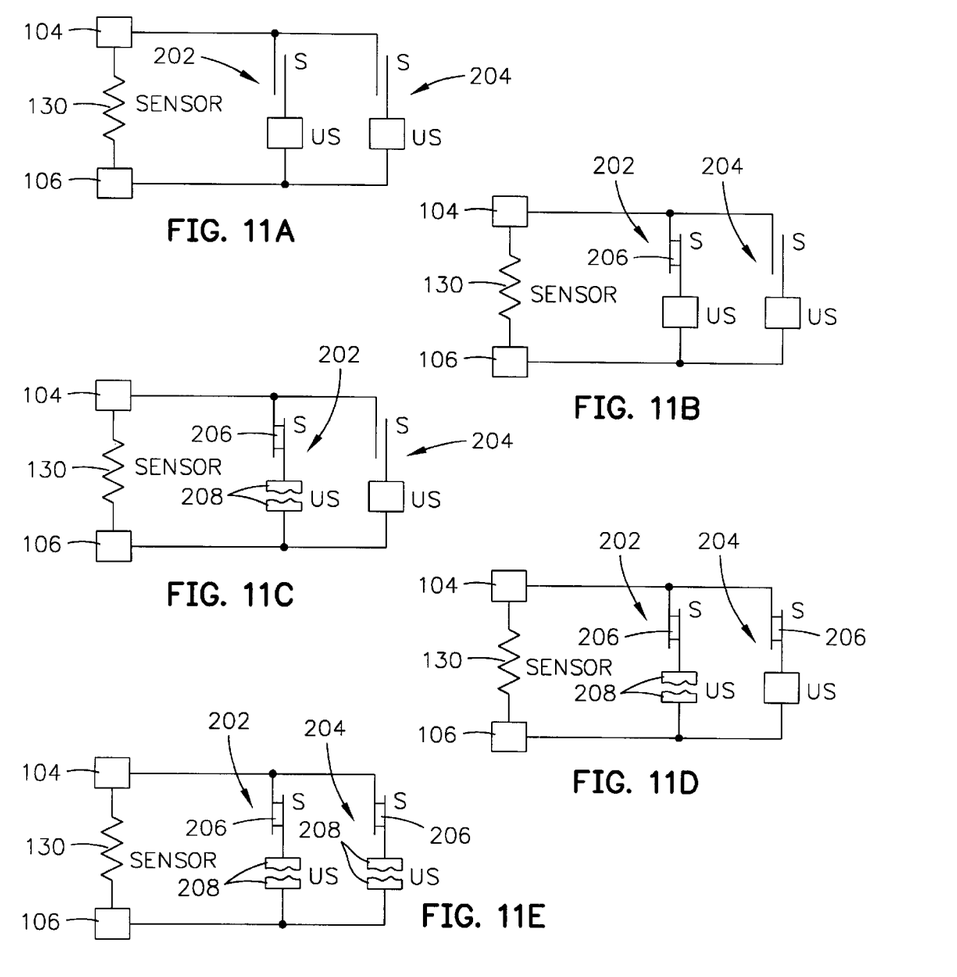
FIGS. 11A–11E illustrate schematically the various steps in the operation of a two one-cycle switch across a read sensor.

FIGS. 11A–11E schematically illustrate a series of steps in the operation of the two-cycle switch. In FIG. 11A the one-cycle switches 202 and 204 are both open across the terminal pads 104 and 106 that are connected to the sensor 130. In FIG. 11B the shorting switch 206 of the one-cycle switch 202 has been activated with a laser causing a short across the terminal pads 104 and 106 to protect the sensor 130 from ESDs. In FIG. 11C a laser beam is directed onto the unshorting switch 208 of the one-cycle switch 202 for opening the sense current circuit so that probes can be applied to the terminal pads 104 and 106 for testing the read head. In FIG. 11D the laser beam has been directed toward the shorting switch 206 of the one-cycle switch 204 to once again close the sense current circuit and protect the sensor 130 from ESDs. In FIG. 11E the laser beam has been directed toward the unshorting switch 208 of the one-cycle switch 204 opening the sense current circuit so as to once again permit probes to be connected to the terminal pads 104 and 106 for testing the read head.

Figure 12A:
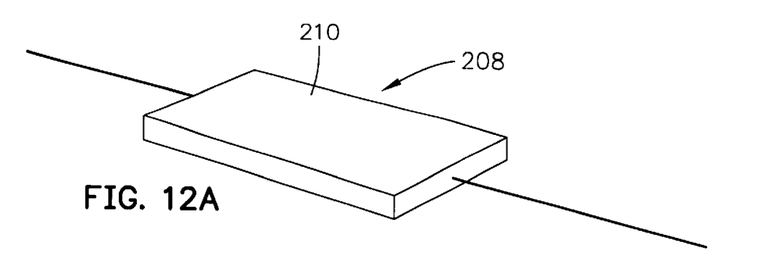
FIGS. 12A–12B show an isometric schematic illustration of an unshorting switch before unshorting and after unshorting.
Figure 12B:
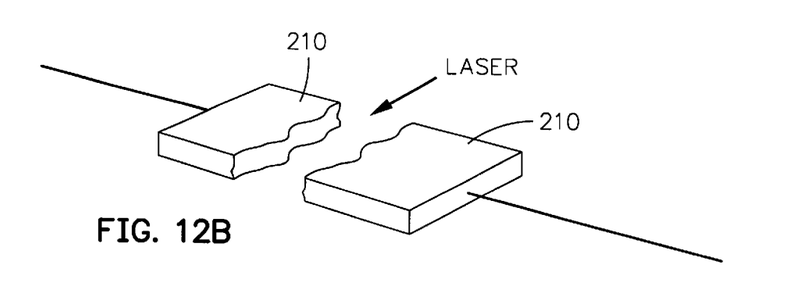

An example of the unshorting switch 208 before and after unshorting is illustrated in FIGS. 12A and 12B. The unshorting switch 208 may be a thin element of conductive material, such as Permalloy ($Ni_{80}Fe_{20}$), tantalum (Ta), nickel iron chromium (NiFeCr) or gold (Au). The filament 210 should be a material of a sufficient thickness to withstand ESDs, but yet be sufficiently thin to be severed by a laser, as shown in FIG. 12B, without heat of the laser beam damaging any components of the magnetic head assembly. The technology of the unshorting switch is described in commonly owned U.S. Pat. 5,759,428 which is incorporated by reference herein.

Figure 13A:
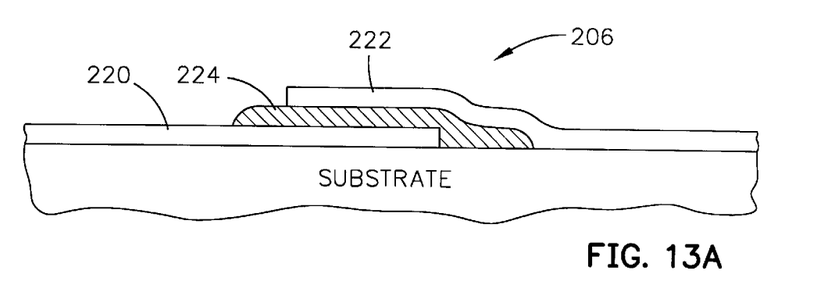
FIGS. 13A–13B show a cross-sectional view and a top view, respectively, of a first embodiment of a shorting switch.
Figure 13B:
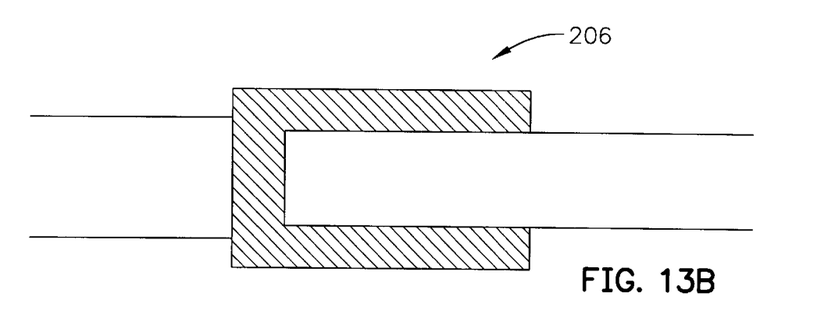

FIGS. 13A and 13B illustrate a side cross-sectional view and a top plane view, respectively, of a preferred embodiment of the shorting switch 206. The shorting switch 206 includes first and second thin conductive strips 220 and 222 which are separated by an insulation layer 224. Each of the strips 220 and 222 may be composed of Permalloy ($Ni_{80}Fe_{20}$), tantalum (Ta), nickel iron chromium (NiFeCr), or gold (Au). The insulation layer 224 may be aluminum oxide ($Al_2O_3$) or silicon (Si). The materials and thicknesses of the strips 220 and 222 and the insulation layer 224 are to be such that when the shorting switch 206 is subjected to a laser beam the strips and the insulator will melt together causing the strips 220 and 222 to be electrically connected to short the read head circuit, which will be discussed in more detail hereinafter.

Figure 14A:
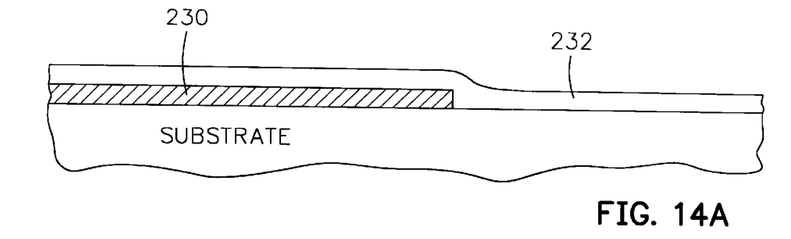
FIGS. 14A–14D illustrate a series of steps in the construction of a second embodiment of the shorting switch.
Figure 14B:
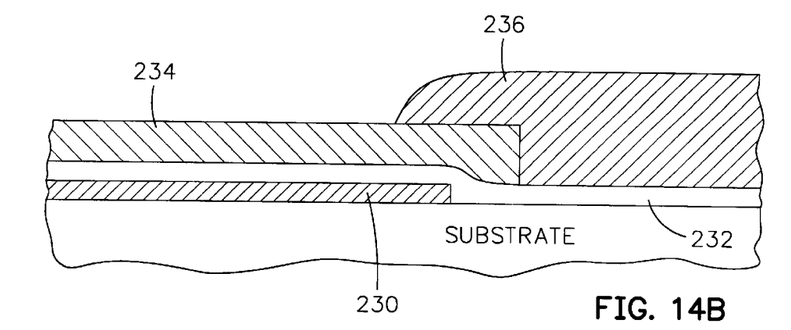
Figure 14C:
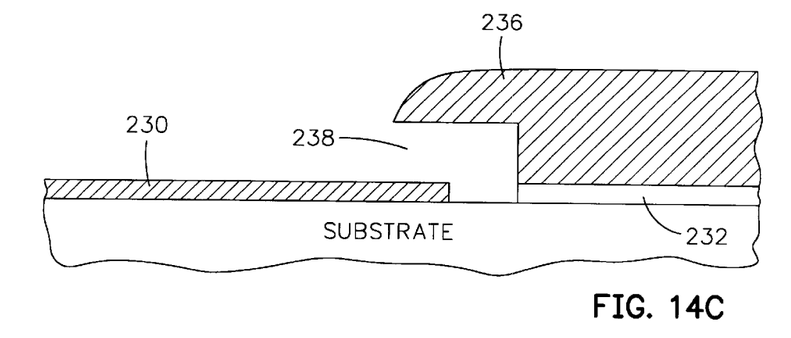
Figure 14D:
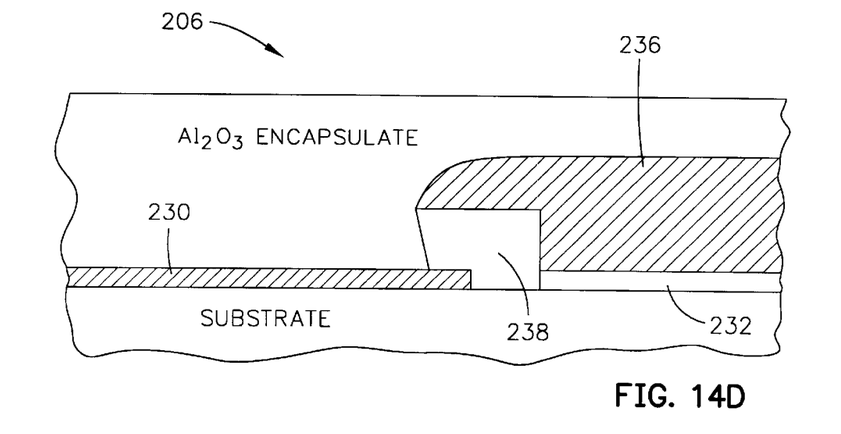

FIGS. 14A–14D illustrate various steps in construction of another embodiment of the shorting switch 206 shown in FIG. 14D. As shown in FIG. 14A, a first lead 230 may be constructed on a substrate by any suitable means such as sputter deposition after photopatterning, or plating on a seed layer (not shown) after photopatterning. Next, a seed layer 232 is formed on the lead 230 as well as on the substrate where the lead 230 is non-existent. The seed layer is typically formed by sputter deposition. In FIG. 14B the substrate is photopatterned with photoresist 234 which covers the seed layer directly above the lead 230 and a portion of the seed layer extending beyond the lead 230. A second lead 236 is then plated thicker than the first lead 230 causing the second lead 236 to overlap the photoresist 234 and a portion of the first lead 230. In FIG. 14C the photoresist is removed by dissolving and the seed layer is selectively removed from all locations except under the second lead 236. Selective removal may be accomplished by making the first and second leads 230 and 236 of gold (Au) and the seed layer of nickel iron ($Ni_{80}Fe_{20}$) so that an etchant, such as hydrochloric acid (HCL), will remove the nickel iron ($Ni_{80}Fe_{20}$) but will not remove the gold (Au). What is left is the first and second leads 230 and 236 separated from one another by a void 238. In FIG. 14D aluminum oxide ($Al_2O_3$) may be sputter deposited on the substrate which covers the first and second leads 230 and 236 leaving the void 238 in place. When the shorting switch 206 in FIG. 14D is subjected to the laser beam, the laser beam penetrates the aluminum oxide (Al$_2$O$_3$) layer and melts the tip of the second lead 236 causing this tip to contact the first lead 230 and short the read head circuit.

Figure 15A:
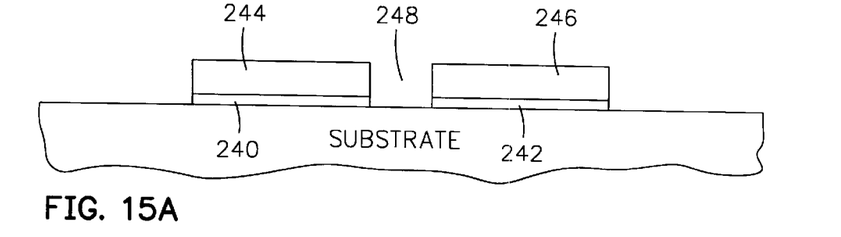
FIGS. 15A–15D illustrate another series of steps in the construction of a third embodiment of the shorting switch.
Figure 15B:
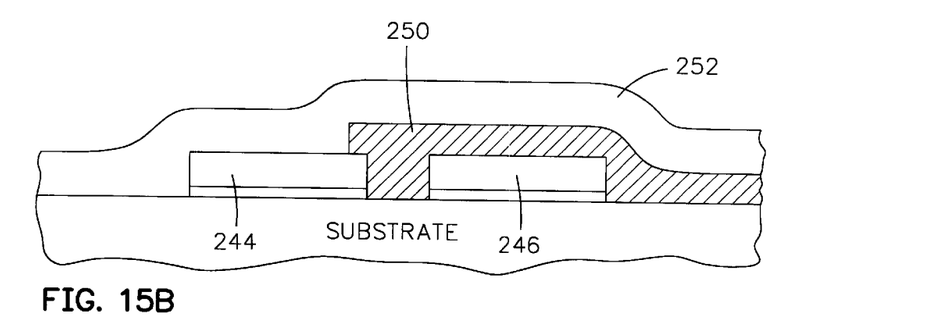
Figure 15C:
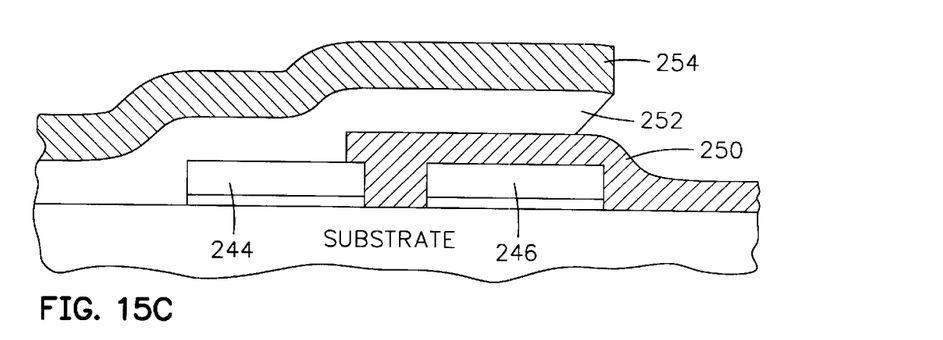
Figure 15D:
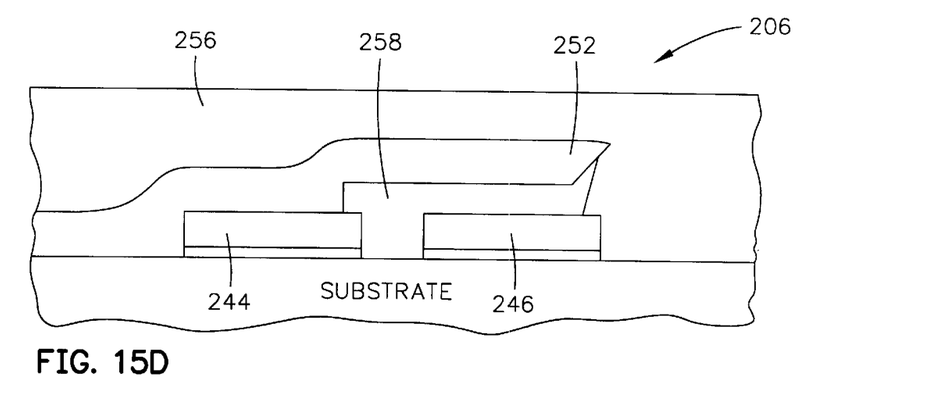

FIGS. 15A–15D illustrate a series of steps for constructing another embodiment 206 of the shorting switch, which is illustrated in FIG. 15D. In FIG. 15A seed layers 240 and 242 are sputter deposited after photopatterning and first and second leads 244 and 246 are plated with a void 248 therebetween. In FIG. 15B the substrate is photopatterned with photoresist 250 covering the second lead 246 and a portion of the first lead 244. A layer of insulative material 252, such as aluminum oxide (Al$_2$O$_3$), is sputter deposited on the substrate covering the photoresist 250 and the exposed portion of the first lead layer 244. In FIG. 15C the substrate is once again photopatterned with a photoresist layer 254 covering the insulation layer 252 over both of the first and second leads 244 and 246. The insulation layer 252 is then etched away which leaves most of the insulation layer below the photoresist layer 254. In FIG. 15D the photoresist layers 250 and 254 are removed by dissolving and an overcoat layer 256 of insulative material, such as aluminum oxide (Al$_2$O$_3$), is sputter deposited on the substrate leaving the first and second leads 244 and 246 separated by a void 258. When the shorting switch 206 in FIG. 15D is subjected to the laser beam the beam penetrates the insulation layers 256 and 252 causing the first and second leads 244 and 246 to melt and join together to short the read head circuit. Preferred material for the first and second leads 244 and 246 is solder.

Figure 16A:
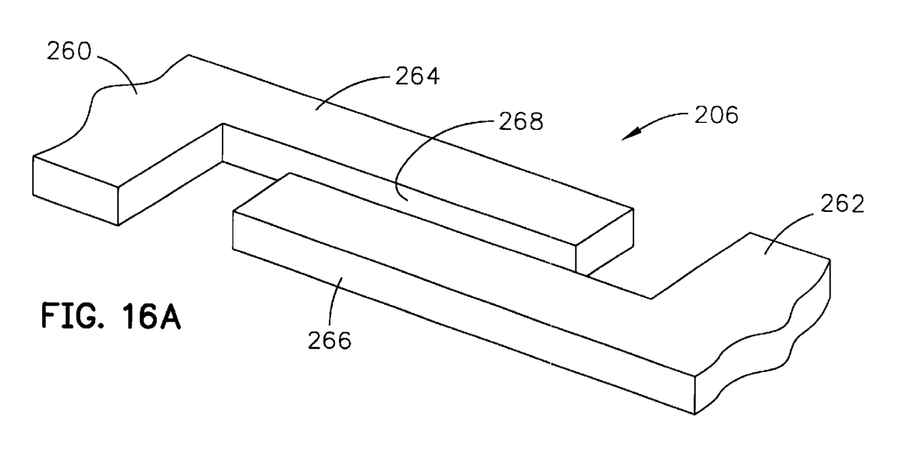
FIGS. 16A and 16B show a fourth embodiment of the shorting switch before and after shorting, respectively.
Figure 16B:
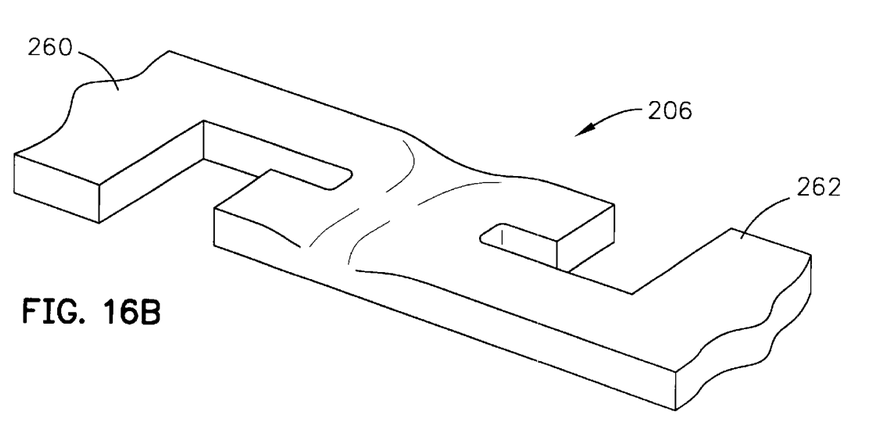

FIGS. 16A and 16B illustrate another example of the shorting switch 206 before and after shorting the read head circuit. In FIG. 16A the shorting switch includes first and second leads 260 and 262 which have strips 264 and 266, respectively, which are spaced by a void 268. When the shorting switch is subjected to the laser beam the strips 264 and 268 melt and connect to short the read head circuit. It is preferred that the strips 264 and 266 be composed of solder. The shorting switch 206 shown in FIGS. 16A and 16B is specially adapted for use on the surface of the end of the slider instead of being embedded therein.

Example

Figure 17A:
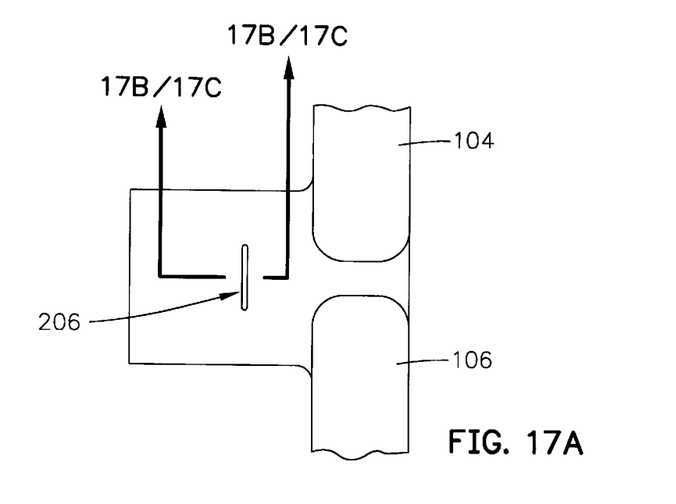
FIGS. 17A–17C illustrate various views of the first embodiment of the shorting switch with FIG. 17B showing the shorting switch before shorting and FIG. 17C showing the switch after being shorted by a laser beam.
Figure 17B:
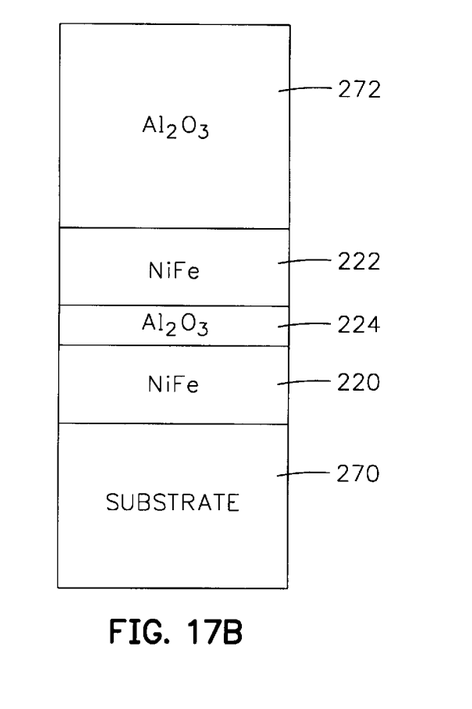
Figure 17C:
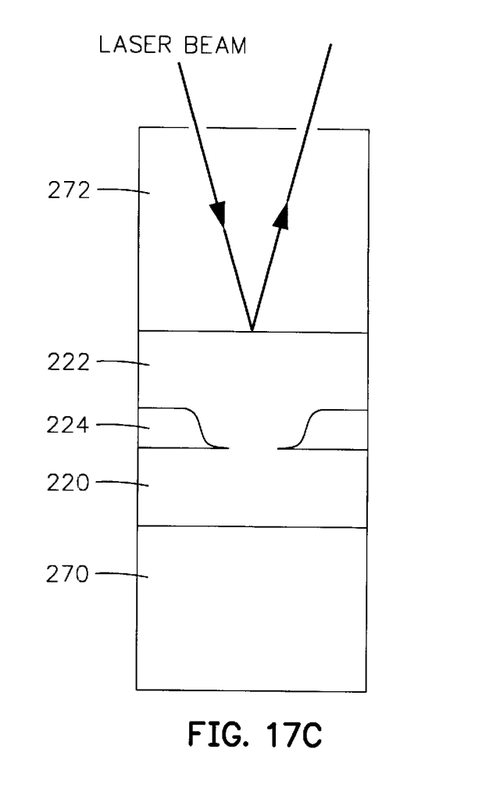

FIGS. 17A–17C illustrate an example of a shorting switch 206 which corresponds to the shorting switch 206 shown in FIGS. 13A and 13B. FIG. 17A is a mock-up of a portion of a slider with the shorting switch 206 visible below an alumina (Al$_2$O$_3$) overcoat. The shorting switch is connected to first and second terminal pads 104 and 106. FIGS. 17B and 17C are cross-sections of the shorting switch before and after shorting by a laser beam. The first lead layer 220 is on a substrate 270, the insulation layer 224 is on the first lead layer 220, the second lead layer 222 is on the insulation layer 224 and an insulation overcoat layer 272, which is selected to be transparent to laser beams, is on the second lead layer 222. The substrate 270 was titanium carbide (TiC), the first lead layer 220 was 0.3 $\mu$m of nickel iron (Ni$_{80}$Fe$_{20}$), the insulation layer 224 was 0.19 $\mu$m of alumina (Al$_2$O$_3$), the second lead layer 222 was 0.3 $\mu$m of nickel iron (Ni$_{80}$Fe$_{20}$) and the overcoat layer 272 was 22.7 $\mu$m of alumina (Al$_2$O$_3$). The shorting switch was subjected to a laser beam which was transmitted through the overcoat layer 272 and melted the second lead layer 222 and the insulation layer 224 to cause the first and second lead layers 220 and 222 to melt together and short-circuit the read head circuit. The laser beam was produced by a Nd:YLF laser having a wavelength of 1,047 $\mu$m, a pulse width of 10 ns, a power of 100 mv, a spot size of 15 $\mu$m, a pulse rate of 6 kHZ and a fluence of 10 J/cm$^2$. The resistance of the shorting switch before shorting was 10 m and the resistance after shorting was 4. The terminal pads 104 and 106 were gold (Au) and were connected to subterranean nickel iron (NiFe) films (not shown) which, in turn, were connected to the shorting switch 206. The insulation layer 224 is constructed so that it will melt when subjected to the laser beam directly or indirectly by the melting and/or heating of one or both of the lead layers 220 and 222.

Figure 18:
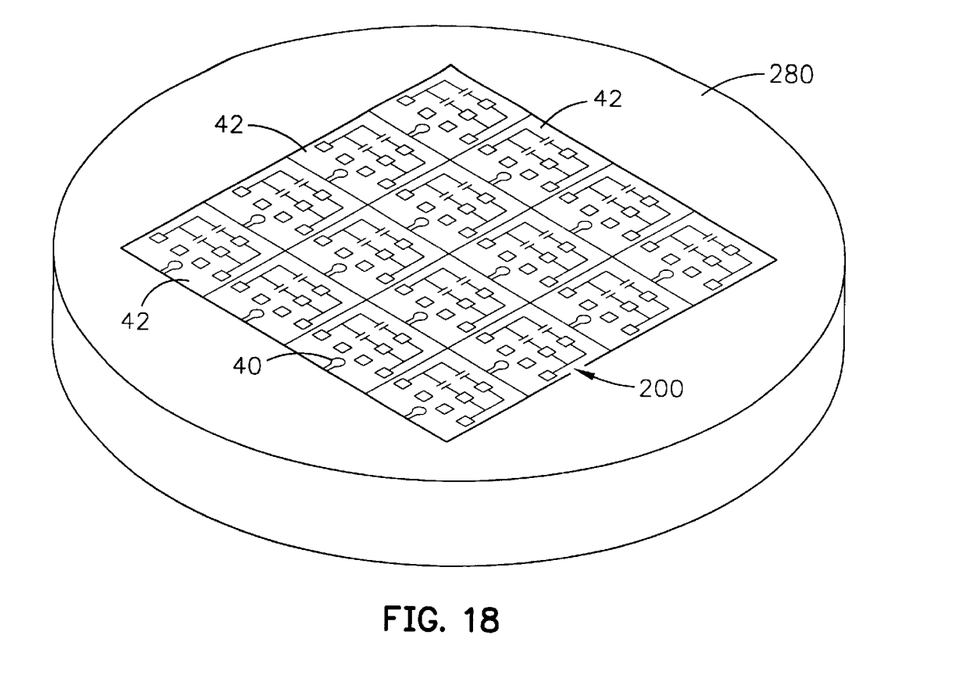
FIG. 18 shows a wafer with rows and columns of sliders.

FIG. 18 shows a wafer 280 with rows and columns of sliders 42 wherein each slider has a magnetic head assembly and an N-cycle switch 200. The wafer 280 is diced into rows of sliders with a portion of one row of sliders illustrated in FIG. 19. The row of sliders is then diced into individual sliders along the phantom lines 282 to form individual sliders, one of which is shown at 42 in FIGS. 1–5.

Discussion

It should be understood that an N-cycle switch is intended to include one one-cycle switch or multiple one-cycle switches as described hereinabove. If only one test is to be conducted only one one-cycle switch may be employed, however, if multiple tests are to be undertaken two or more one-cycle switches may be employed. It should also be understood that other materials and lasers may be employed for practicing the invention other than that described hereinabove without departing from the spirit of the invention. It should also be understood that the shorting and unshorting switches may be on the surface of the end of the slider or embedded in the slider, as shown in FIG. 2. A preferred embodiment is to embed the shorting and unshorting switches so as to protect them from contamination and prevent any ESD from being applied to them.

Figure 19:
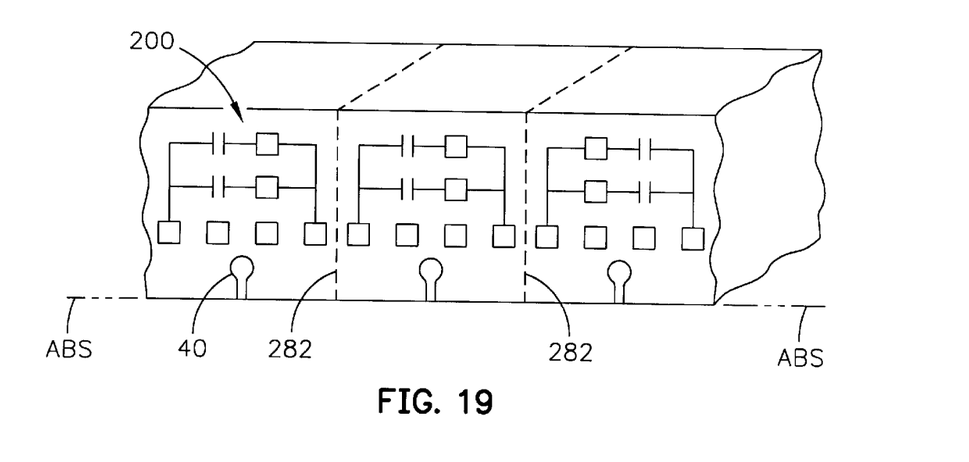
FIG. 19 shows an end view of a portion of a row of sliders wherein each slider has two one-cycle switches connected across terminal pads of a respective read head sensor.

In a preferred embodiment each of the shorting and unshorting switches 206 and 208 in FIG. 19 are located a predetermined vertical distance from the ABS and a predetermined lateral distance from a respective magnetic head assembly 40. In practicing the invention the laser tool is located directly over a shorting or unshorting switch using a respective magnetic head assembly as bench marks. The laser beam can then be directed directly on the switch to be activated.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. An N-cycle switch for a magnetic read head comprising:
   at least a one cycle switch connected across a read head circuit which includes said magnetic read head;
   said at least one cycle switch including a shorting switch and an unshorting switch for shorting and unshorting, respectively, the read head circuit;
   each shorting switch and unshorting switch being constructed for activation by a laser beam; and
   the unshorting switch being a metal strip which can be severed by the laser beam;
   the shorting switch including:
   first and second spaced apart contacts; and
   the space between the first and second contacts being a void.

2. An N-cycle switch as claimed in claim 1 including:
first and second electrically insulative layers;
the second contact being located between the first and second electrically insulative layers.

3. An N-cycle switch as claimed in claim 1 including multiple one cycle switches connected across the read head circuit.

4. A magnetic head assembly comprising:
a slider bounded by first and second major surfaces, first and second side edges and first and second end edges wherein the first major surface is an air bearing surface (ABS);
a write head embedded in the slider adjacent to the second end edge;
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head embedded in the slider adjacent the second end edge;
the read head including:
a sensor;
a ferromagnetic first shield layer;
the sensor being located between the first shield layer and the first pole piece layer; and
first and second terminal pads connected to the sensor for conducting a sense current therethrough; and
at least a one cycle switch connected across the first and second terminal pads;
said at least one cycle switch including a shorting switch and an unshorting switch for shorting across the terminal pads and unshorting across the terminal pads, respectively; and
each shorting switch and unshorting switch being constructed for activation by a laser beam;
the unshorting switch being a metal strip which can be severed by the laser beam;
the shorting switch including:
first and second contacts;
the slider having a first electrically insulative layer located between and interfacing the first and second contacts; and
the first electrically insulative layer being constructed of a material which melts when subjected to said laser beam directly or is caused to melt by heating and/or melting of one or both of said first and second contacts;
the slider having a second electrically insulative layer which is located between the second end edge and the second contact so that the second contact is located between the first and second electrically insulative layers; and
the first contact of the shorting switch being embedded in the slider a predetermined distance below the second end edge of the slider by said second electrically insulative layer and being located a predetermined distance from the ABS.

5. A magnetic head assembly as claimed in claim 4 wherein the unshorting switch is embedded in the slider a predetermined distance below the second end edge of the slider and is located a predetermined distance from the ABS.

6. A magnetic head assembly as claimed in claim 4 including multiple one cycle switches connected across the read head.

7. A magnetic head assembly as claimed in claim 6 wherein the first electrically insulative layer is aluminum oxide ($Al_2O_3$).

8. A magnetic head assembly comprising:
a slider bounded by first and second major surfaces, first and second side edges and first and second end edges wherein the first major surface is an air bearing surface (ABS);
a write head embedded in the slider adjacent to the second end edge;
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers;
the first and second pole piece layers being connected at their back gap portions; and
a read head embedded in the slider adjacent the second end edge;
the read head including:
a sensor;
a ferromagnetic first shield layer,
the sensor being located between the first shield layer and the first pole piece layer; and
first and second terminal pads connected to the sensor for conducting a sense current therethrough; and
at least a one cycle switch connected across the first and second terminal pads;
said at least one cycle switch including a shorting switch and an unshorting switch for shorting across the terminal pads and unshorting across the terminal pads, respectively; and
each shorting switch and unshorting switch being constructed for activation by a laser beam;
the unshorting switch being a metal strip which can be severed by the laser beam; and
the shorting switch including:
first and second spaced apart contacts; and
the space between the first and second contacts being a void.

9. A magnetic head assembly as claimed in claim 8 including multiple one cycle switches connected across the read head.

10. A row of integrally interconnected slider assemblies comprising:
each slider assembly including a slider body bounded by first and second major surfaces, first and second side edges and first and second end edges wherein the first major surface is an air bearing surface (ABS);
a write head embedded in each slider body adjacent the second end edge;
the write head including:
ferromagnetic first and second pole piece layers;

each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between
the yoke portions of the first and second pole piece layers; and
the first and second pole piece layers being connected at their back gap portions; and
a read head embedded in each slider body adjacent the second end edge;
the read head including:
a sensor;
a ferromagnetic first shield layer;
the sensor being located between the first shield layer and the first pole piece layer; and
first and second terminal pads connected to the sensor for conducting a sense current therethrough; and
at least a one cycle switch connected across the first and second terminal pads;
said at least one cycle switch including a shorting switch and an unshorting switch for
shorting across the terminal pads and unshorting across the terminal pads, respectively;
each shorting switch and unshorting switch being constructed for activation by a laser beam;
each unshorting switch being a metal strip which can be severed by the laser beam;
each shorting switch including:
first and second contacts;
the slider body having a first electrically insulative layer located between and interfacing the first and second contacts; and
the first electrically insulative layer being constructed of a material which melts when subjected to said laser beam directly or is caused to melt by heating and/or melting of one or both of said first and second contacts; and
each shorting switch being embedded in a respective slider body a predetermined distance below the second end edge of the slider body and is located a predetermined distance from the ABS.

11. A row of integrally interconnected slider assemblies as claimed in claim 10 wherein each unshorting switch is embedded in the slider body a predetermined distance below the second end edge of the slider body and is located a predetermined distance from the ABS.

12. A row of integrally interconnected slider assemblies as claimed in claim 10 including multiple one cycle switches connected across each read head.

13. A row of integrally interconnected slider assemblies as claimed in claim 12 wherein each of the first electrically insulative layers is aluminum oxide ($Al_2O_3$).

14. A row of integrally interconnected slider assemblies comprising:
each slider assembly including a slider body bounded by first and second major surfaces, first and second side edges and first and second end edges wherein the first major surface is an air bearing surface (ABS);
a write head embedded in each slider body adjacent the second end edge;
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
a read head embedded in each slider body adjacent the second end edge;
the read head including:
a sensor;
a ferromagnetic first shield layer;
the sensor being located between the first shield layer and the first pole piece layer; and
first and second terminal pads connected to the sensor for conducting a sense current therethrough; and
at least a one cycle switch connected across the first and second terminal pads;
said at least one cycle switch including a shorting switch and an unshorting switch for shorting across the terminal pads and unshorting across the terminal pads, respectively;
each shorting switch and unshorting switch being constructed for activation by a laser beam;
each unshorting switch being a metal strip which can be severed by the laser beam; and
each shorting switch including:
first and second spaced apart contacts; and
the space between the first and second contacts being a void.

15. A row of integrally interconnected slider assemblies as claimed in claim 14 wherein each shorting switch is embedded in a respective slider body a predetermined distance below the second end edge of the slider body and is located a predetermined distance from the ABS.

16. A row of integrally interconnected slider assemblies as claimed in claim 15 wherein each unshorting switch is embedded in the slider body a predetermined distance below the second end edge of the slider body and is located a predetermined distance from the ABS.

17. A row of integrally interconnected slider assemblies as claimed in claim 14 including multiple one cycle switches connected across each read head.

18. A wafer having rows and columns of slider assemblies:
each slider assembly including:
a slider body bounded by first and second major surfaces, first and second side edges and first and second end edges wherein the first major surface is an air bearing surface (ABS);
a write head embedded in the slider body adjacent the second end edge;
a read head embedded in the slider body adjacent the second end edge;
each write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers;

the first and second pole piece layers being connected at their back gap portions; and each read head including:
  a sensor;
  a ferromagnetic first shield layer;
  the sensor being located between the first shield layer and the first pole piece layer;
  first and second terminal pads connected to the sensor for conducting a sense current therethrough;
  at least a one cycle switch connected across the first and second terminal pads;
  said at least one cycle switch including a shorting switch and an unshorting switch for shorting across the terminal pads and unshorting across the terminal pads, respectively; and
  each shorting switch and unshorting switch being constructed for activation by a laser beam;
  each unshorting switch being a metal strip which can be severed by the laser beam; each shorting switch including:
    first and second contacts;
    the slider body having a first electrically insulative layer located between and interfacing the first and second contacts; and
    the first electrically insulative layer being constructed of a material which melts when subjected to said laser beam directly or is caused to melt by heating and/or melting of one or both of said first and second contacts; and
    each shorting switch being embedded in a respective slider body a predetermined distance below the second end edge of the slider body and being located a predetermined distance from the ABS.

19. A wafer having rows and columns of slider assemblies as claimed in claim 18 wherein each unshorting switch is embedded in the slider body a predetermined distance below the second end edge of the slider body and is located a predetermined distance from the ABS.

20. A wafer having rows and columns of slider assemblies as claimed in claim 18 including multiple one cycle switches connected across each magnetic head.

21. A wafer having rows and columns of slider assemblies as claimed in claim 20 wherein each of the first electrically insulative layers is aluminum oxide ($Al_2O_3$).

22. A wafer having rows and columns of slider assemblies:
  each slider assembly including:
    a slider body bounded by first and second major surfaces, first and second side edges and first and second end edges wherein the first major surface is an air bearing surface (ABS);
    a write head embedded in the slider body adjacent the second end edge;
    a read head embedded in the slider body adjacent the second end edge; each write head including:
      ferromagnetic first and second pole piece layers;
      each of the first and second pole piece layers having a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers;
      the first and second pole piece layers being connected at their back gap portions; and
  each read head including:
    a sensor;
    a ferromagnetic first shield layer;
    the sensor being located between the first shield layer and the first pole piece layer;
    first and second terminal pads connected to the sensor for conducting a sense current therethrough;
    at least a one cycle switch connected across the first and second terminal pads;
    said at least one cycle switch including a shorting switch and an unshorting switch for shorting across the terminal pads and unshorting across the terminal pads, respectively; and
    each shorting switch and unshorting switch being constructed for activation by a laser beam; and
    each unshorting switch being a metal strip which can be severed by the laser beam; each shorting switch including:
      first and second spaced apart contacts; and
      the space between the first and second contacts being a void.

23. A wafer having rows and columns of slider assemblies as claimed in claim 22 wherein each shorting switch is embedded in a respective slider body a predetermined distance below the second end edge of the slider body and is located a predetermined distance from the ABS.

24. A wafer having rows and columns of slider assemblies as claimed in claim 23 wherein each unshorting switch is embedded in the slider body a predetermined distance below the second end edge of the slider body and is located a predetermined distance from the ABS.

25. A wafer having rows and columns of slider assemblies as claimed in claim 22 including multiple one cycle switches connected across each magnetic head.

26. A method of making a wafer having rows and columns of slider assemblies comprising the steps of:
  forming each slider assembly as follows:
    forming a slider body bounded by first and second major surfaces, first and second side edges and first and second end edges wherein the first major surface is an air bearing surface (ABS);
    forming a write head in the slider body adjacent the second end edge;
    forming the write head as follows:
      forming ferromagnetic first and second pole piece layers wherein each of the first and second pole piece layers has a yoke portion located between a pole tip portion and a back gap portion;
      forming a nonmagnetic write gap layer between the pole tip portions of the first and second pole piece layers;
      forming an insulation stack with at least one coil layer embedded therein between the yoke portions of the first and second pole piece layers;
      connecting the first and second pole piece layers at their back gap portions; and
    forming each read head in a respective slider body adjacent the second end edge; the forming of each read head including the steps of:
      forming a sensor;
      forming a ferromagnetic first shield layer;
      forming the sensor between the first shield layer and the first pole piece layer;
      connecting first and second terminal pads to the sensor for conducting a sense current therethrough;
    forming at least a one cycle switch across the first and second terminal pads;

forming said at least one cycle switch to include a shorting switch and an unshorting switch for shorting across the first and second terminal pads and unshorting across the first and second terminal pads, respectively; and forming each shorting switch and unshorting switch for activation by a laser beam;

each unshorting switch being formed of a metal strip which can be severed by the laser beam;

each shorting switch being formed comprising the steps of:

forming first and second contacts;

forming each slider body with a first electrically insulative layer between the respective first and second contacts;

the first electrically insulative layer being formed of an insulation material which melts when subjected to said laser beam directly or is caused to melt by heating and/or melting of one or both of said first and second contacts; and each shorting switch in a respective slider body being formed a predetermined distance below the second end edge of the slider body with the first contact being a predetermined distance from the ABS.

27. A method as claimed in claim 26 wherein each unshorting switch in the slider body is formed a predetermined distance below the second end edge of the slider body with the shorting switch being a predetermined distance from the ABS.

28. A method as claimed in claim 26 including the step of connecting multiple one cycle switches across the first and second terminal pads.

29. A method as claimed in claim 28 wherein each of the first electrically insulative layers is formed of aluminum oxide ($Al_2O_3$).

30. A method of making a wafer having rows and columns of slider assemblies comprising the steps of:

forming each slider assembly as follows:

forming a slider body bounded by first and second major surfaces, first and second side edges and first and second end edges wherein the first major surface is an air bearing surface (ABS);

forming a write head in the slider body adjacent the second end edge;

forming the write head as follows:

forming ferromagnetic first and second pole piece layers wherein each of the first and second pole piece layers has a yoke portion located between a pole tip portion and a back gap portion;

forming a nonmagnetic write gap layer between the pole tip portions of the first and second pole piece layers;

forming an insulation stack with at least one coil layer embedded therein between the yoke portions of the first and second pole piece layers;

connecting the first and second pole piece layers at their back gap portions; and forming each read head in a respective slider body adjacent the second end edge;

the forming of each read head including the steps of:

forming a sensor;

forming a ferromagnetic first shield layer;

forming the sensor between the first shield layer and the first pole piece layer;

connecting first and second terminal pads to the sensor for conducting a sense current therethrough;

forming at least a one cycle switch across the first and second terminal pads;

forming said at least one cycle switch to include a shorting switch and an unshorting switch for shorting across the first and second terminal pads and unshorting across the first and second terminal pads, respectively; and forming each shorting switch and unshorting switch for activation by a laser beam;

each unshorting switch being formed of a metal strip which can be severed by the laser beam; and each shorting switch being formed of first and second spaced apart contacts with the space between the first and second contacts being a void.

31. A method as claimed in claim 30 wherein each shorting switch in a respective slider body is formed a predetermined distance below the second end edge of the slider body with the first contact being a predetermined distance from the ABS.

32. A method as claimed in claim 31 wherein each unshorting switch in the slider body is formed a predetermined distance below the second end edge of the slider body with the shorting switch being a predetermined distance from the ABS.

* * * * *